United States Patent [19]

Shelley

[11] Patent Number: 4,469,917
[45] Date of Patent: Sep. 4, 1984

[54] TIME SYNCHRONIZED DATA TRANSMISSION SYSTEM

[76] Inventor: Edwin F. Shelley, 339 Oxford Rd., New Rochelle, N.Y. 10804

[21] Appl. No.: 449,756

[22] Filed: Dec. 14, 1982

[51] Int. Cl.³ .......................................... H04M 11/08
[52] U.S. Cl. ............................. 179/2 DP; 179/2 AM
[58] Field of Search ................... 179/2 A, 2 AM, 2 B, 179/2 C, 2 DP, 2 TC, 84 C, 89

[56] References Cited

U.S. PATENT DOCUMENTS

| | | | |
|---|---|---|---|
| 4,104,486 | 8/1978 | Martin et al. | 179/2 AM |
| 4,126,762 | 11/1978 | Martin et al. | 179/2 A |
| 4,345,113 | 8/1982 | Shelley | 179/2 A |
| 4,394,540 | 7/1983 | Willis et al. | 179/2 AM |
| 4,438,295 | 3/1984 | Hales | 179/2 A |

OTHER PUBLICATIONS

James Guilder, "Telephone Accessory: Turn-On Appliances Via Long Distance", *Radio Electronics*, vol. 48, No. 4, Apr. 1977, pp. 39-42 & 95.

*Primary Examiner*—Keith E. George
*Attorney, Agent, or Firm*—Kenyon & Kenyon

[57] ABSTRACT

A time synchronized data transmission system which allows a computer to access a remote data set via a non-dedicated telephone line is disclosed. The system is coupled to a telephone instrument, a data set and the telephone transmission line. The system disconnects the telephone instrument from the transmission line during predetermined time intervals. During these time intervals, a computer can communicate with the data set via the telephone line without ringing the telephone instrument. In the event the user wishes to use the telephone instrument during the predetermined time intervals when the telephone instrument is disconnected, a subscriber priority circuit allows the user to recouple the instrument to the line by merely lifting the telephone handset.

9 Claims, 1 Drawing Figure

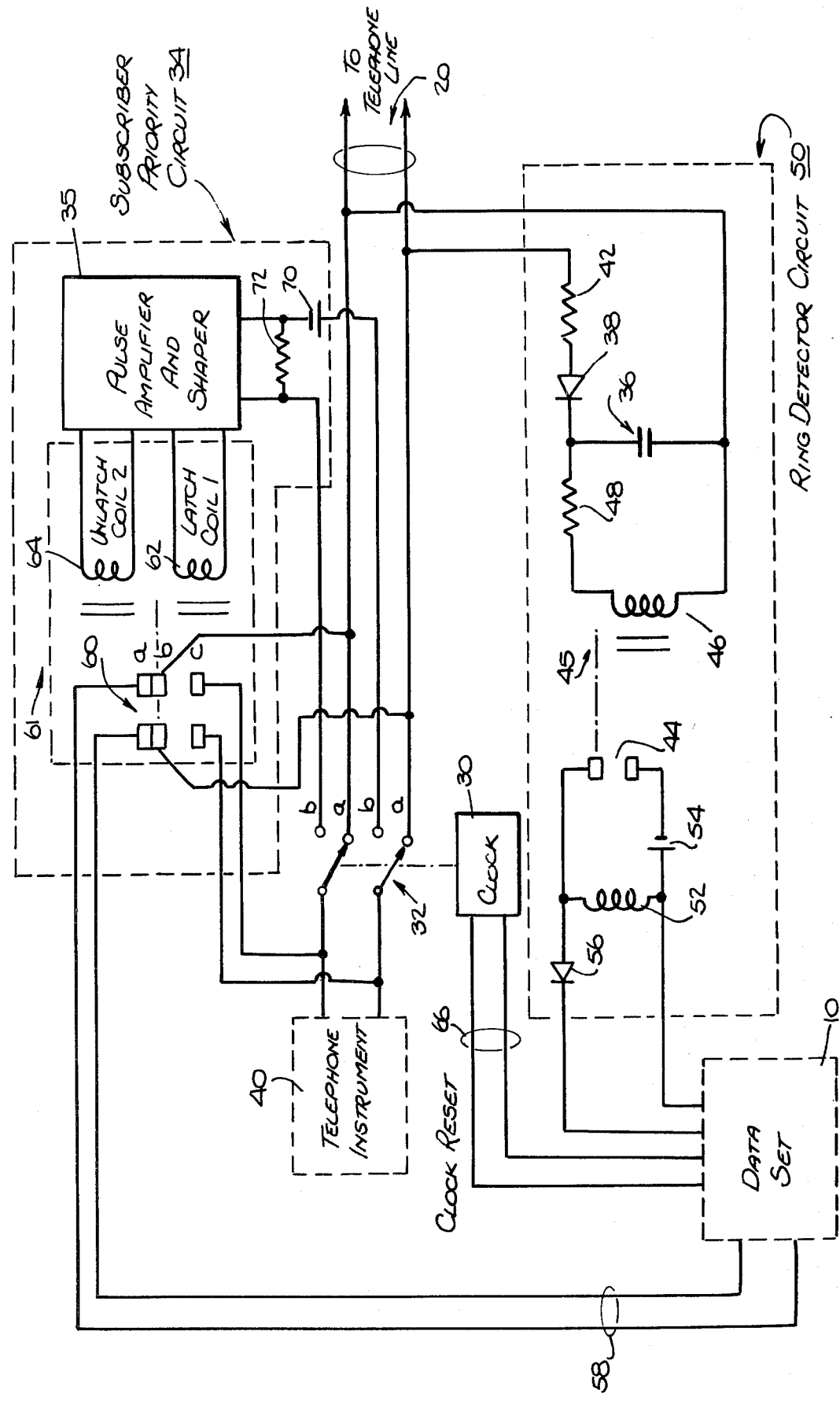

TIME SYNCHRONIZED DATA TRANSMISSION SYSTEM

BACKGROUND OF THE INVENTION

1. Field of the Invention

The present invention relates generally to telephone data transmission systems, and more particularly to a time synchronized data transmission system which allows a central computer, for example, to access a remote data set, such as an electronic publication storage device, a hybrid telephone-cable TV polling system, or a computer data base subscriber's data set, via telephone lines and during predetermined time intervals, and communicate with that data set without at the same time ringing the subscriber's telephone. The present invention finds application in many areas, one of which, for instance, might be a shop-by-computer system where it might be necessary to transmit information to and from an individual subscriber's data set connected to an information storage device. Another might be the field of power demand data retrieval, wherein a central computer accesses a remote data set which has stored therein data corresponding to the electrical or other power consumed at the remote location. Still another might be remote control of heating, ventilating and air conditioning equipment through telephone lines.

2. Description of the Prior Art

Various systems are presently in existence which allow central computers to access individual subscriber's data sets via dedicated telephone lines. It is preferable to use the subscriber's existing telephone line rather than install a separate dedicated line to provide access to the data set. Thus, systems of this type require that the telephone line be available for both use by ordinary persons and by computers calling the subscriber. A requirement of systems of this type is that when computer calls are received the call is automatically transferred to a data set and the telephone does not ring.

In applicant's prior U.S. Pat. No. 4,345,113, an automatic telephone message interception system is described which permits the use of a single telephone line for both ordinary personal use and for receiving calls from a computer, wherein computer calls are automatically transferred to the subscriber's data set without ringing the subscriber's telephone. An ordinary (non-computer) call made to the subscriber, would, however, be answered by the automatic telephone message interception system described in the above U.S. patent even if no one were present at the subscriber's telephone. The caller would thus be charged for a brief call even though no one answered the phone.

The subscriber could, of course, solve this problem by shutting off the automatic system if the telephone is to be left unattended, but the data set could not be accessed by the computer while the system was shut off.

Thus, the need exists for a system which both allows a central computer to access the subscriber's data set via a non-dedicated telephone line and which allows normal operation of the telephone by both the subscriber and other persons calling the subscriber. In particular such a system should allow a computer to access the subscriber's data set without ringing the subscriber's telephone and should allow persons to call the subscriber at any time without being charged for the call if the telephone is unanswered.

SUMMARY OF THE INVENTION

It is therefore an object of the invention to provide an improved automatic data transmission system which allows a central computer to access the subscriber's data set without causing the subscriber's telephone to ring.

It is a further object of the invention to provide an automatic data transmission system which allows normal use of the subscriber's telephone by the subscriber at all times.

Another object of the invention is to provide an automatic data transmission system in which a central computer accesses the subscriber's data set only during predetermined time intervals.

A still further object of the invention is to prevent persons calling the subscriber from being charged for the call when the telephone is not answered by the subscriber.

A yet further object is to permit complete disconnection of the telephone from the telephone line during the predetermined time intervals when the central computer is allowed to access the subscriber's data set so that persons calling the subscriber during these time intervals obtain a ringing signal which indicates that the subscriber is not answering the call and so that callers are not charged for such calls.

These and other objects of the present invention are achieved in an apparatus for coupling a telephone data set to a telephone transmission line connected to telephone instrument so as to enable the communication of data on the telephone transmission line to and from the data set from a remote location without ringing the telephone instrument. The system comprises first means, coupled to the telephone transmission line and the telephone instrument and normally connecting the telephone instrument to the telephone transmission line, for disconnecting the telephone instrument from the telephone transmission line during a predetermined time interval, and second means, coupled to the telephone transmission line and the data set, for detecting a first electrical signal transmitted on the telephone transmission line and generating a second electrical signal indicating that the first electrical signal on the telephone transmission line has terminated, the data set being coupled to the second means and the telephone transmission line and being adapted to communicate data on the telephone transmission line in response to the generation of the second electrical signal.

In a preferred embodiment, third means, coupled to the data set, the telephone instrument and the telephone transmission line, for connecting the telephone instrument to the telephone transmission line and for disconnecting the data set from the telephone transmission line in response to a first signal generated by the telephone instrument during the predetermined time interval and for disconnecting the telephone instrument and reconnecting the data set to the telephone transmission line in response to a second signal generated by the telephone instrument during the predetermined time interval, is provided so that the subscriber can restore normal use of the telephone instrument even during the predetermined time interval.

BRIEF DESCRIPTION OF THE DRAWING

The above objects and other novel features and advantages of the invention will be described in greater detail in the following detailed description with reference to the single drawing FIGURE which is a schematic diagram of one embodiment of a time synchronized data transmission system according to the present invention.

DETAILED DESCRIPTION

With reference now to the drawing, a time synchronized data transmission system is shown schematically in the single FIGURE. A central computer is programmed to access each subscriber's data set 10 in a predetermined sequence at pre-selected times through each subscriber's telephone line, indicated by reference numeral 20. The present invention allows the central computer to call a subscriber during a pre-selected time interval and the call will not be completed and the subscriber's telephone will not ring, but at the termination of the calling signal the subscriber's data set will be triggered to dial-up the central computer and communicate with this computer. Two-way communication is contemplated, i.e., the data set may both receive data from the computer and transmit data to the computer. Additionally, the subscriber may regain use of the telephone instrument during data transmission simply by lifting the telephone receiver.

A multi-gang switch 32 driven by clock 30 couples an ordinary telephone instrument 40 to telephone line 20 via contacts a except during a preset time interval or intervals each day, week or month, for example. During the time that the telephone 40 is connected to the line 20 via contacts a, the telephone instrument will ring for all calls and can be used as a normal telephone. Clock 30 might be an electronic or electromechanical clock and switch 32 could be an electromechanical switch or relay or a semiconductor switching device having low forward impedance.

When the preset time interval occurs, which might be, for example, during the night so as to cause as little interference with normal telephone service as possible, switch 32 is driven so that contacts b are engaged. This disconnects the telephone line 20 from the telephone instrument and connects the telephone instrument to a subscriber priority circuit 34 which reconnects the telephone to the line if the telephone receiver is lifted. Subscriber priority circuit 34 will be described in greater detail later.

After the start of the preset time interval, any caller attempting to call the subscriber will perceive a "no answer" situation, i.e., the line will continue to ring but the phone will not be answered because the telephone instrument is disconnected and cannot ring and the call will not be completed.

The device shown in the figure further includes a ring detector circuit 50, the operation of which will now be explained. If the central computer calls during the preset time interval, or if anyone else calls, the ring signal on the telephone line will charge capacitor 36 through rectifying diode 38 and isolating resistor 42. Contacts 44 operated by relay coil 46 of relay 45 will therefore close once relay coil 46 is energized. Resistor 48 and capacitor 36 have a time constant chosen so that capacitor 36 remains sufficiently charged between successive rings of the same call and coil 46 remains energized. When the caller hangs up and the ringing stops, capacitor 36 will slowly discharge through resistor 48 and coil 46 until relay 45 becomes deenergized, opening contacts 44. A voltage source 54 and an inductor 52 in series are disposed across contacts 44. When contacts 44 open, a voltage pulse is induced across inductor 52. This pulse is coupled through diode 56 to the data set 10 to trigger the data set's dial-up function. (Diode 56 insures that only pulses of the proper polarity are coupled to the data set. Thus the opposite pulse induced across inductor 52 when contacts 44 close will not be coupled to the data set.) The data set 10 can then dial up the central computer through output lines 58 which are used both for dial-up routines and for data transmission and through pairs of contacts a and b of contacts 60 of relay 61 controlled by relay coils 62 and 64. The operation of relay coils 62 and 64 will be described later with reference to the subscriber priority circuit 34. At the time that the data set 10 initiates the dial-up routine and when the telephone handset is down, the pairs of contacts a and b of contacts 60 will be made, so that the data set output lines are connected to the telephone line 20 and the central computer can be dialed up and communication between data set and computer can occur.

The embodiment of ring detector circuit 50 shown in the figure is only one form of the circuit. Relay 45 could be replaced by a switching transistor, for example, and the inductor 52 and related circuitry could be replaced by a single shot or monostable multivibrator triggered to output a pulse when the switching transistor is biased off when the ringing signal terminates.

Should a non-computer call be received during the preset time interval, the data set 10 will dial-up the computer even though the computer did not call. The computer, however, can be programmed so that it would ignore the return call because it did not call the data set. Also, the computer is programmed so that it does not call the subscriber at any other times except during the preset time intervals.

The data set can be any of many commercially available devices. For example, if the system of the invention is used to obtain data regarding the electric power used by a consumer, it might comprise a Power Demand Accumulator Model 2000 Series manufactured by Fairchild Space and Electronics Company. The present invention would allow such a device to be coupled to the consumer's normal telephone line and allow power meter readings to be read over the telephone line during the predetermined time periods when the telephone instrument is disconnected from the line.

Upon completion of the communication between data set 10 and central computer, the central computer can send a signal to the data set to cause the clock to terminate the pre-set time interval via reset lines 66. This would return the subscriber's telephone instrument to sole possession of the telephone line through contacts a of clock-driven switch 32. If no signal is fed to the clock, it will perform this function at the end of the pre-set time interval.

The subscriber priority circuit 34 mentioned earlier is designed to re-connect the telephone instrument 40 to the telephone line 20 during the pre-set time interval when it is normally disconnected if the subscriber lifts the telephone handset to use the phone. During the pre-set time interval the telephone instrument is connected through contacts b of switch 32 to voltage source 70, resistor 72 and pulse amplifier and shaper 35. When the telephone handset is lifted a voltage pulse of a particular polarity appears across resistor 72. This pulse energizes latch coil 62 of relay 61 through pulse amplifier and shaper 35 and connects the telephone instrument through contacts b and c of relay 61 to the telephone line 20, while disconnecting the data set from the telephone line by opening normally closed contacts a and b of relay 61. When the subscriber replaces the telephone handset ("hangs up") a pulse of opposite polarity to the previous pulse energizes unlatch coil 64 of relay 61 and opens contacts b and c and closes contacts a and b, thus disconnecting the telephone instrument from the telephone line and reconnecting the data set to the telephone line. The pulse amplifier and shaper circuit therefore performs the dual function of shaping the pulse at its input and discriminating between positive and negative pulses so as to energize the proper relay coil 62 or 64. Pulse amplifier and shaper 35 may take the form of various circuits known in the art.

Although the circuit diagram shown in the FIGURE indicates discrete components, and schematically indicates some electromechanical relays and switches, it is clear that the system can be constructed utilizing discrete semiconductor devices or embodied in a solid state, integrated circuit produced on a silicon or similar chip. For example, the function of the electromechanical relays which are schematically indicated in the figure could be performed by switching transistors.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus for coupling a telephone data set to a telephone transmission line connected to a telephone instrument so as to enable the communication of data without ringing said telephone instrument, comprising:
   first means, coupled to said telephone transmission line and said telephone instrument and normally connecting said telephone instrument to said telephone transmission line, for disconnecting said telephone instrument from said telephone transmission line during a predetermined time interval; and
   second means, coupled to said telephone transmission line and said data set, for detecting a first electrical signal, such as a ringing signal indicative of a call from a caller, transmitted on said telephone transmission line, without answering the call and for generating a second electrical signal when said first electrical signal on said telephone transmission line has terminated, indicating that the caller has hung up;
   said data set being coupled to said second means and said telephone transmission line and being adapted to communicate data in response to the generation of said second electrical signal after said first electrical signal has terminated when said caller has hung up.

2. The apparatus recited in claim 1, further comprising third means, coupled to said data set, said telephone instrument and said telephone transmission line, for connecting said telephone instrument to said telephone transmission line and disconnecting said data set from said telephone transmission line in response to a first electrical signal generated by said telephone instrument during said predetermined time interval, and for disconnecting said telephone instrument from said telephone transmission line and reconnecting said data set to said telephone transmission line in response to a second electrical signal generated by said telephone instrument during said predetermined time interval.

3. The apparatus recited in claim 1 wherein said first means comprises:
   first switching means, coupled to said telephone instrument and said telephone transmission line and normally connecting said telephone instrument to said telephone transmission line; and
   clock means, coupled to said switching means;
   said switching means being driven by said clock means and disconnecting said telephone instrument from said telephone transmission line at the start of said predetermined time interval and connecting said telephone instrument to said telephone transmission line at the end of said predetermined time interval.

4. The apparatus recited in claim 3 wherein said clock means generates first and second electrical signals during said predetermined time interval and said switching means disconnects said telephone instrument from said telephone transmission line at the start of said predetermined time interval in response to said first electrical signal generated by said clock means and connects said telephone instrument to said telephone transmission line at the end of said predetermined time interval in response to said second electrical signal generated by said clock means.

5. The apparatus recited in claim 1 wherein said first electrical signal transmitted on said telephone transmission line comprises a ringing signal and wherein said second means generates said second electrical signal when the transmission of said ringing signal on said telephone transmission line terminates.

6. The apparatus recited in claim 5 wherein said second means comprises:
   induction means coupled to said data set;
   a source of voltage coupled to said induction means; and
   second switching means, coupled to said telephone transmission line and said source of voltage, and responsive to said ringing signal, for connecting said source of voltage to said induction means when said ringing signal is present on said telephone transmission line and for disconnecting said source of voltage from said induction means when said ringing signal terminates, said induction means generating said second electrical signal when said source of voltage is disconnected.

7. The apparatus recited in claim 2 wherein said third means comprises:
   third switching means coupled to said telephone transmission line, said data set and said telephone instrument, and normally connecting said telephone transmission line to said data set; and
   circuit means, coupled to said first switching means and said third switching means, for generating first and second electrical signals, and being responsive to said first and second signals generated by said telephone instrument, said circuit means coupled to said telephone instrument by said first switching means during said predetermined time interval;
   said third switching means being responsive to said first and second signals generated by said circuit means and disconnecting said data set from said telephone transmission line and connecting said telephone instrument to said telephone transmission line in response to said first signal generated by said circuit means and connecting said data set to said telephone transmission line and disconnecting said telephone instrument from said telephone transmission line in response to said second signal generated by said circuit means.

8. The apparatus recited in claim 7 wherein said first signal generated by said telephone instrument is generated when the telephone receiver is lifted, and said second signal generated by said telephone instrument is generated when the telephone receiver is replaced.

9. The apparatus recited in claim 8 wherein said first and second signals generated by said telephone instrument comprise pulse signals of opposite polarity and said circuit means includes pulse discrimination means for discriminating between said pulse signals generated by said telephone instrument.

* * * * *